(12) United States Patent
Namuduri et al.

(10) Patent No.: US 7,936,113 B2
(45) Date of Patent: May 3, 2011

(54) HARVESTING ENERGY FROM VEHICULAR VIBRATIONS USING PIEZOELECTRIC DEVICES

(75) Inventors: Chandra S. Namuduri, Troy, MI (US); Yunjun Li, West Bloomfield, MI (US); Timothy J. Talty, Beverly Hills, MI (US); Robert B. Elliott, Waterford, MI (US); Nancy McMahon, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 176 days.

(21) Appl. No.: 12/394,438

(22) Filed: Feb. 27, 2009

(65) Prior Publication Data

US 2010/0219721 A1     Sep. 2, 2010

(51) Int. Cl.
*H01L 41/113* (2006.01)
(52) U.S. Cl. ......................... 310/339; 310/319
(58) Field of Classification Search .............. 310/319, 310/339
See application file for complete search history.

(56) References Cited

U.S. PATENT DOCUMENTS

| | | | |
|---|---|---|---|
| 4,297,609 A * | 10/1981 | Hirao et al. | 310/339 |
| 4,757,315 A | 7/1988 | Lichtenberg et al. | |
| 4,817,922 A | 4/1989 | Hovance | |
| 4,822,063 A | 4/1989 | Yopp et al. | |
| 4,836,578 A | 6/1989 | Soltis | |
| 5,009,450 A | 4/1991 | Herberg et al. | |
| 5,218,308 A | 6/1993 | Bosebeck et al. | |
| 5,251,729 A | 10/1993 | Nehl et al. | |
| 5,267,466 A | 12/1993 | Morris | |
| 5,373,445 A | 12/1994 | Yopp | |
| 5,461,564 A | 10/1995 | Collins et al. | |
| 5,638,927 A | 6/1997 | Cheatham et al. | |
| 5,990,441 A | 11/1999 | Zaenglein et al. | |
| 6,069,581 A | 5/2000 | Bell et al. | |
| 6,209,691 B1 | 4/2001 | Fehring et al. | |
| 6,427,812 B2 * | 8/2002 | Crawley et al. | 188/266.7 |
| 7,420,462 B2 | 9/2008 | Nordmeyer | |
| 7,733,239 B2 | 6/2010 | Nordmeyer | |
| 7,777,396 B2 * | 8/2010 | Rastegar et al. | 310/339 |
| 2006/0186586 A1 * | 8/2006 | Soles et al. | 267/64.27 |
| 2006/0271678 A1 | 11/2006 | Jessup et al. | |
| 2007/0205881 A1 * | 9/2007 | Breed | 340/447 |
| 2007/0251776 A1 * | 11/2007 | Braun | 188/266 |

(Continued)

FOREIGN PATENT DOCUMENTS

FR     2594755 A3 *  8/1987

(Continued)

OTHER PUBLICATIONS

Notice of Allowance mailed Oct. 8, 2010, issued in U.S. Appl. No. 12/400,112.
Sang-Dong, K., et al., "Performance Analysis of UWB Radar for Vehicle in Multi-User Environments," 10th International Conference on Advanced Communication Technology, ICACT. Feb. 17-20, 2008, pp. 1036-1039, vol. 2.

(Continued)

*Primary Examiner* — Thomas M Dougherty
(74) *Attorney, Agent, or Firm* — Ingrassia Fisher & Lorenz, P.C.

(57) ABSTRACT

An energy harvesting apparatus, for deployment on a vehicle, comprises a shock absorber, including a dust tube assembly, a jounce bumper assembly mounted within the dust tube assembly at a first end thereof, and a damper tube mounted for telescopic movement through a second end of the dust tube, the jounce bumper assembly configured for impact with the damper tube. A piezoelectric device is coupled to the jounce bumper assembly.

20 Claims, 3 Drawing Sheets

U.S. PATENT DOCUMENTS

| | | |
|---|---|---|
| 2008/0116849 A1 | 5/2008 | Johnston |
| 2008/0252174 A1 | 10/2008 | Mohammadi et al. |
| 2009/0021720 A1 | 1/2009 | Hecker |
| 2009/0045698 A1* | 2/2009 | Genis et al. .................. 310/339 |
| 2010/0052475 A1* | 3/2010 | Lee .............................. 310/319 |
| 2010/0094503 A1 | 4/2010 | Li et al. |
| 2010/0123568 A1 | 5/2010 | Namuduri et al. |
| 2010/0125389 A1 | 5/2010 | Talty et al. |
| 2010/0219641 A1 | 9/2010 | Namuduri et al. |
| 2010/0219720 A1 | 9/2010 | Namuduri et al. |
| 2010/0219798 A1 | 9/2010 | Namuduri et al. |
| 2010/0225527 A1 | 9/2010 | Talty et al. |

FOREIGN PATENT DOCUMENTS

| | | |
|---|---|---|
| JP | 60-101425 A * | 11/1983 |
| JP | 4359901 B1 * | 11/2009 |

OTHER PUBLICATIONS

Samkov, S.V., "Signal Processing in UWB Radars of Small Distance," 2004 Second International Workshop on Ultrawideband and Ultrashort Impulse Signals. Sep. 19-22, 2004, pp. 208-210.

Optek Technology, Inc. "Optek's Autopad Contactless Sensor Delivers Absolute Position, Angle and Linear Displacement Sensing." [Retrieved on Aug. 11, 2008]. Retrieved from Internet: <URL: http://license.icopyright.net/user/viewFreeUse.act?fuid=MTM4Mjg4MQ%3D%3D>.

Li, Y., et al. "Self-Powered Vehicle Sensor Systems," U.S. Appl. No. 12/900,707.

Chinese Office Action for Chinese Application No. 200910206391.1 mailed Jan. 19, 2011.

U.S. Office Action for U.S. Appl. No. 12/271,551 mailed Feb. 10, 2011.

* cited by examiner ers. The jounce bumper is used
HARVESTING ENERGY FROM VEHICULAR VIBRATIONS USING PIEZOELECTRIC DEVICES

TECHNICAL FIELD

This relates generally to a system for generating power and, more particularly, to a system for harvesting energy from vehicular vibrations utilizing piezoelectric devices.

BACKGROUND OF THE INVENTION

Increasing demands for better fuel economy have lead to improvements and developments in hybrid vehicles, electric vehicles, and vehicles powered by fuel cells or diesel fuel. Efforts on the part of the automotive industry to increase fuel economy have included, but are not limited to, reductions in mass, improved aerodynamics, active fuel management, direct injection engines, homogeneous charge compression ignition engines, and hybrid engines. Still, other mechanisms, techniques, and energy sources that will improve fuel economy are continually being sought. To this end, the use of piezoelectric materials to harvest energy has received a great deal of attention in recent years. As is well known, the piezoelectric effect involves the conversion of mechanical strain into electric current or voltage. Many different sources could provide the requisite strain; e.g. human motion, seismic activity, vibrations, etc.

It is generally known that vehicles are subjected to vibrations, especially while being driven. These vibrations have typically been considered undesirable. In fact, a great deal of effort has gone into the development of suspension systems that include springs, dampers, shock absorbers, and the like, that provide vehicular stability and insulate the vehicle's passenger compartment from vibration caused by, for example, driving on bumpy or otherwise tortuous roadways. For example, resilient bumpers such as elastomeric jounce bumpers are typically used in vehicular suspension systems for cushioning impacts between two metallic members such as frame member and control arm. The jounce bumper is used to stiffen the suspension gradually as it approaches the end of its jounce travel. This cushions the impact, thus reducing noise and other undesirable consequences of the impact.

Currently, the energy associated with these vibrations is lost. However, harvesting and utilizing this energy would provide an additional source of energy that could be used to increase fuel economy. The ability to tap this additional source of energy while not compromising the benefits of modern vehicular suspension systems would greatly benefit both the automotive industry and their customers.

SUMMARY

In accordance with an embodiment, an energy harvesting apparatus is provided for deployment on a vehicle. The apparatus comprises a shock absorber including a dust tube assembly, a jounce bumper assembly mounted within the dust tube assembly at a first end thereof, and a damper tube assembly mounted for telescopic movement within the dust tube assembly and through a second end thereof, the jounce bumper assembly configured to be impacted by the damper tube assembly. A piezoelectric device coupled to the jounce bumper assembly.

DESCRIPTION OF THE DRAWINGS

The embodiments will hereinafter be described in conjunction with the following drawing figures, wherein like numerals denote like elements, and.

DESCRIPTION OF AN EXEMPLARY EMBODIMENT

The following detailed description is merely illustrative in nature and is not intended to limit the invention or the application and uses of the invention. Furthermore, there is no intention to be bound by any expressed or implied theory presented in the preceding technical field, background, brief summary or the following detailed description. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to semiconductor processing, transistor theory, packaging, and power modules are not described in detail herein.

The following description refers to elements or nodes or features being "connected" or "coupled" together. As used herein, unless expressly stated otherwise, "connected" means that one element/node/feature is directly joined to (or directly communicates with) another element, node or other feature in mechanical, logical, electrical or other appropriate sense. Likewise, unless expressly stated otherwise, "coupled" means that one element/node/feature is directly or indirectly joined to (or directly or indirectly communicates with) another element/node/feature in a mechanical, logical, electrical or other appropriate sense. The term "exemplary" is used in the sense of "example," rather than "model." Further, although the figures may depict example arrangements of elements, additional intervening elements, devices, features, or components may be present in a practical embodiment of the invention.

Piezoelectricity is a characteristic of certain materials to generate an electric potential when they are subjected to a mechanical stress. Known piezoelectric materials include, but are not limited to, naturally occurring crystals, man-made crystals, and certain ceramics. More recently, piezoelectric fiber composite two-terminal transducers have been developed that have certain advantages over bulk piezoelectric ceramics. For example, they are lighter, more flexible, and more robust. Higher piezoelectric voltage coefficients can be obtained from piezoelectric fiber composites resulting in more generated power. Furthermore, piezoelectric fiber composites can be created inexpensively to user defined shapes. They provide increased strength over monolithic materials as a result of fiber lead sharing, and may be laminated with durable polyethylene sheets for additional toughness. Piezoelectric fiber composites may be used singly, or multiply in parallel, to accumulate power for an extended period of time.

Such devices are well known and commercially available from Advanced Cerametrics, Inc., located in Lambertville, N.J.

Figure 1:
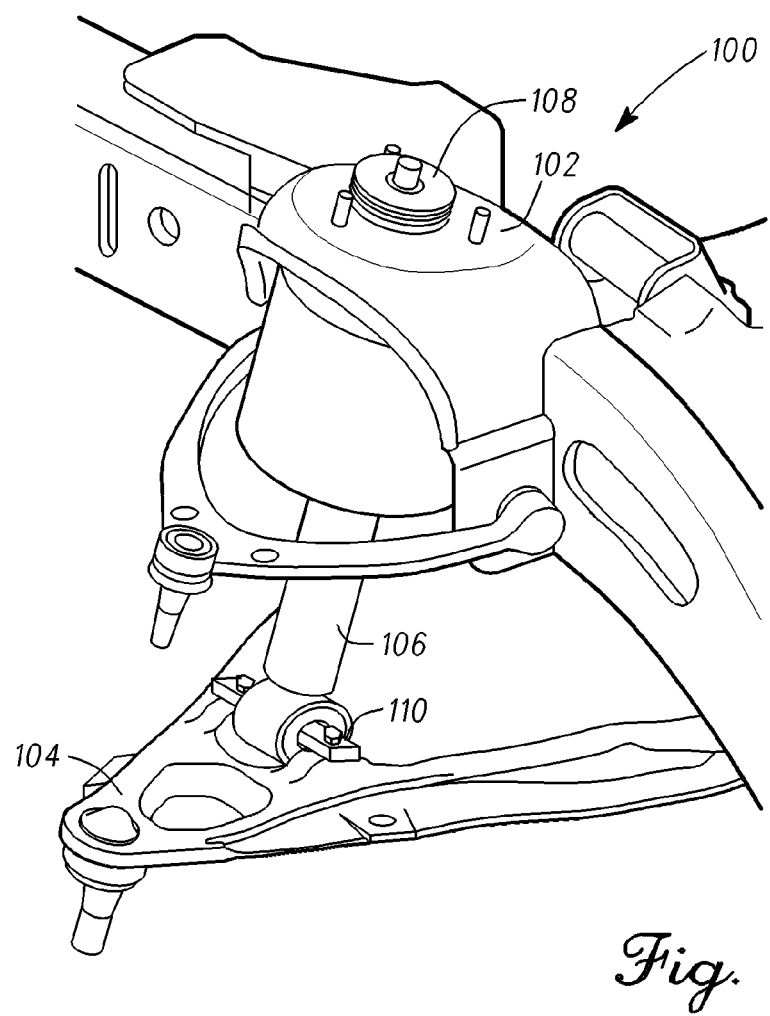
FIG. 1 is an isometric view of a traditional vehicular suspension system.

FIG. 1 illustrates a typical vehicular suspension system 100 that comprises a sprung mass such as frame member 102, an unsprung mass such as control arm 104, and a shock absorber 106 coupled between frame member 103 and control arm 104. Shock absorber 138 may be coupled to frame member 102 and control arm 104 by any suitable means including mounting brackets and fasteners such as is shown at 108 and 110 respectively. Upper and/or lower mounts 108 and 110 may include a bushing to provide for limited lateral motion between the vehicle's sprung and unsprung mass. During vehicle motion, shock absorber 138 provides a flexible and damped response to substantially vertical motion between the sprung and unsprung masses so as to control such motions thus providing a more comfortable ride to the passengers.

Figure 2:
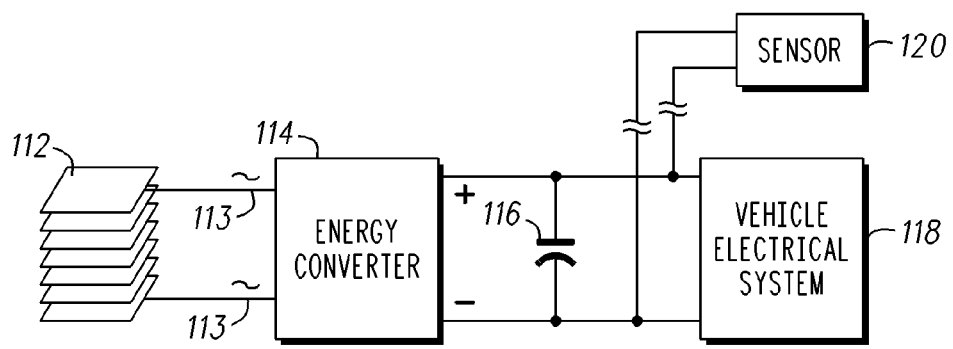
FIG. 2 is a functional block diagram of an energy harvesting apparatus in accordance with a first embodiment.

FIG. 2 is a functional block diagram of an apparatus for generating energy utilizing a single layer or stacked multi-layer piezoelectric fiber composite (PFC) 112 (shown as a multilayer stack in FIG. 2) having an AC output coupled to energy converter 114 (e.g. a rectifier). The output of energy converter 114 is coupled to an energy storage device 116 (e.g. a capacitor and/or a battery). The output of energy converter 114 may also be coupled to a vehicle's electrical system 118 or, if desired, may provide power to one or more sensors 120 that, in turn, provide information to one or more of the vehicle's on-board processors.

Figure 3:
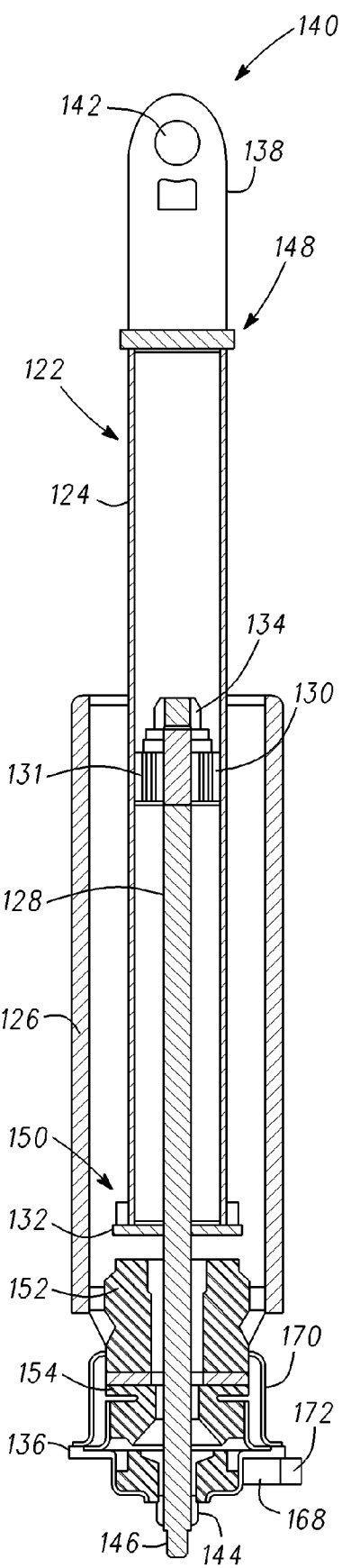
FIG. 3 is a cross-sectional view of a shock absorber.
Figure 3:

FIG. 3 is a cross-sectional view of a typical shock absorber 122. It comprises a damper tube assembly 124, an exterior cylindrical housing or dust tube assembly 126, a piston rod 128, a piston 130 secured on piston rod 128 by nut 134, a jounce bumper stopper 132, an elastomeric jounce bumper assembly, an upper mount assembly 136, and a lower mounting bracket 138. Shock absorber 122 is coupled in a conventional manner to lower control arm 104 (FIG. 1) at a first end 140 utilizing opening 142 in bracket 138 that is configured to receive a suitable fastener. Shock absorber 122 is likewise conventionally coupled at a second end to frame member 102 by means of a self-locking flange nut 144 that is screwed onto a threaded end 146 of piston rod 128. Damper tube assembly 124 is coupled to mounting bracket 138 (and thus is coupled to the unsprung vehicle mass) at a lower end 148 of damper tube assembly 124, and is coupled to jounce bumper stopper 132 at an upper end 150. Piston rod 128 is positioned within damper tube 124 and extends through jounce bumper stopper 132.

A jounce bumper 152 is comprised of, for example, an elastomeric material such as polyurethane, is coupled to a jounce bumper bracket 154 and is disposed concentrically about piston rod 128. Dust tube 126 is coupled to upper mount assembly 136 (and thus to the sprung vehicle mass), and extends concentrically around damper tube 124. Thus, damper tube 124 and dust tube 126 are configured for telescopic movement with respect to each other. That is, damper tube 124 is free to move or vibrate into and out of dust tube 126 as the vehicle encounters perturbations such as bumps and the like in the roadway.

Typically, piston 130 is provided with a plurality of channels 131 therethrough; e.g. low speed bleed holes, a compression port, and a rebound port. Piston 130 is sealed at the inner sidewalls of damper tube assembly 124 forcing all fluid to flow throughout the bleed holes and/or rebound port and compression port, and valves associated therewith (nor shown), to provide the required damping force.

If the surface of a travelled roadway that is rough (i.e. contains bumps, pot-holes, and the like), damper tube assembly 124 will often be forced into dust tube 126, causing jounce bumper stopper 132 to impact and compress jounce bumper assembly 152.

Figure 4:
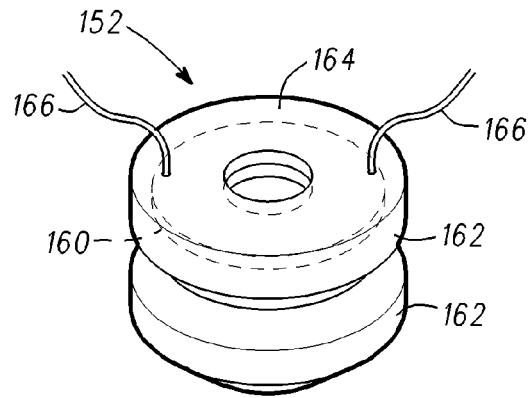
FIG. 4 is an isometric view of a first jounce bumper assembly in accordance with a first embodiment.

FIG. 4 is an isometric view of an annular jounce bumper assembly 152 in accordance with a first embodiment. It comprises a piezoelectric device in the form of, for example, a piezoelectric fiber composite disk 160 (of the type described above) that is imbedded in the elastomeric jounce bumper material 162 near surface 164. When utilized in the shock absorber shown in FIG. 3, surface 164 and therefore piezoelectric disk 160 will be positioned proximate jounce bumper bracket 154 as is shown in FIG. 3. Terminals 166 of piezoelectric disk 160 may, if desired, be coupled to an energy converter (e.g. a rectifier in FIG. 3) via conductors 170. Rectifier 168 may be equipped with a connector 172. When configured in the above described manner, piezoelectric disk will be strained each time jounce bumper stopper 132 engages and compresses jounce bumper assembly 152 causing a voltage to be generated across its terminals. This AC energy may be applied to rectifier 168 for conversion to DC energy that may be used to power one or more sensors and/or stored in a battery and/or capacitor.

Figure 5:
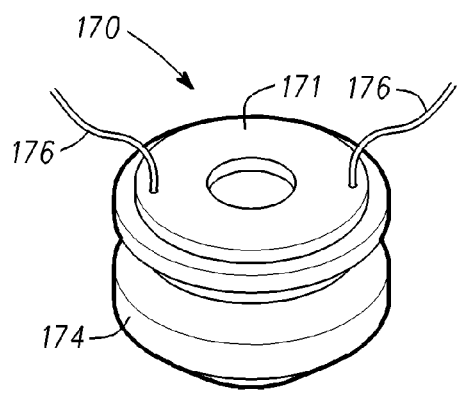
FIG. 5 is an isometric view of a second jounce bumper assembly in accordance with a second embodiment.

FIG. 5 is an isometric view of a jounce bumper assembly 170 in accordance with another embodiment. It differs only with respect to the placement of piezoelectric disk 172. In this embodiment, piezoelectric disk 172 is attached to an outer surface of jounce material 174 such that when jounce bumper 170 is deployed in the shock absorber shown in FIG. 3, piezoelectric disk 172 will be exposed to and reside adjacent jounce bumper bracket 132.

Figure 6:
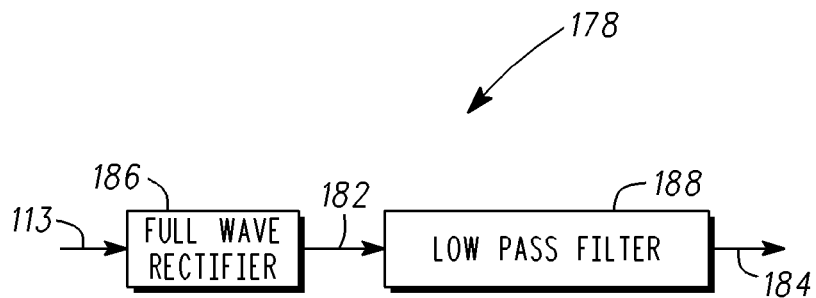
FIG. 6 is a functional block diagram of a rectifying and filtering circuit suitable for use in conjunction with the apparatus shown in FIGS. 3, 4 and 5.
Figure 7:
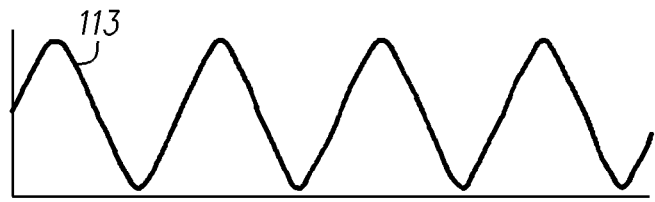
FIGS. 7, 8, and 9 are exemplary waveforms appearing at various points in the block diagram shown in FIG. 6.
Figure 8:
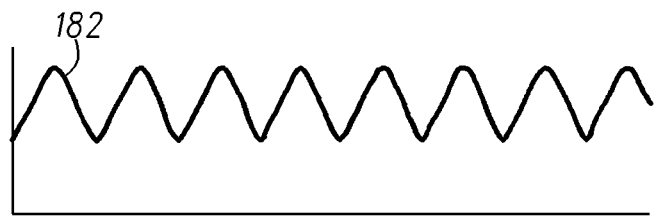
Figure 9:
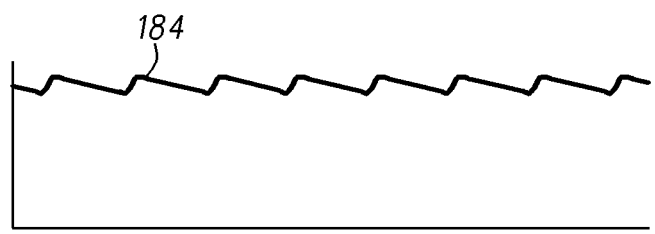

FIG. 6 is a block diagram of a rectifier circuit 168 suitable for use in conjunction with the embodiment shown in FIGS. 3, 4 and 5. FIGS. 7, 8, and 9 illustrate exemplary waveforms 113, 182, and 184 that appear at various places in the block diagram shown in FIG. 6 as will be more fully described below.

Referring to FIGS. 6-9, AC signal (113 in FIG. 2) appearing at the outputs 166 of the piezoelectric disk (FIG. 4) are applied to full wave rectifier 186. The rectified signals 182 (shown in FIG. 8) appearing at the output of rectifier 186 is applied to low pass filter 188 to produce signal 184 (shown in FIG. 9).

Thus, there has been presented an apparatus that harvests energy created when a vehicle's suspension system is acted upon by perturbations (bumps, pot-holes, etc.) in a roadway. Stress and strain on the jounce bumper assemblies are converted to AC electrical energy in a piezoelectric device (e.g. a piezoelectric fiber composite disk). The resultant induced AC energy is then converted to a form suitable for storage and/or use by or storage in the vehicle's electrical system.

While at least one exemplary embodiment has been presented in the foregoing summary and detailed description, it should be appreciated that a vast number of variations exist. For example, the battery or capacitor could be packaged with the rectifier or packaged separately. The rectifier assembly could be mounted remotely from the shock absorber on a separate structure. If desired, a sensor may likewise be mounted on the shock absorber itself and powered by the rectifier. Alternatively, the sensor may be remotely located. It should also be appreciated that the jounce bumper could reside outside the shock absorber, either within or outside a coil spring.

The exemplary embodiments are only examples, and are not intended to limit the scope, applicability, or configuration in any way. Rather, the foregoing summary and detailed description will provide those skilled in the art with a convenient road map for implementing an exemplary embodiment or embodiments of the invention, it being understood that various changes may be made in the function and arrangement of described elements without departing from the scope as set forth in the appended claims and their legal equivalents.

What is claimed is:

1. An energy harvesting apparatus, for deployment on a vehicle, the apparatus comprising:
a shock absorber, comprising:
a dust tube assembly;
a jounce bumper assembly mounted within the dust tube assembly at a first end thereof; and
a damper tube assembly mounted for telescopic movement within the dust tube assembly and through a second end thereof, the jounce bumper assembly configured to be impacted by the damper tube assembly; and;
a piezoelectric device coupled to the jounce bumper assembly.

2. An apparatus according to claim 1 wherein the piezoelectric device is a flexible piezoelectric material.

3. An apparatus according claim 2 wherein the flexible piezoelectric material is imbedded into the jounce bumper assembly.

4. An apparatus according to claim 2 wherein the flexible piezoelectric material is mounted on a surface of the jounce bumper assembly.

5. An apparatus according to claim 2 wherein the piezoelectric material is a flexible disk.

6. An apparatus according to claim 5 wherein the shock absorber comprises a jounce bumper bracket configured for contact with the piezoelectric disk.

7. An apparatus according to claim 2 further comprising an energy converter coupled to the piezoelectric device.

8. An apparatus according to claim 7 wherein the energy converter is a rectifier.

9. An apparatus according to claim 8 wherein the energy rectifier is mounted on the shock absorber.

10. An apparatus according to claim 7 further comprising a sensor coupled to the energy converter.

11. An energy harvesting apparatus for use on a vehicle of the type that includes a sprung mass, an unsprung mass, and a shock absorber coupled between the sprung mass and the unsprung mass, the shock absorber comprising a first member coupled to the sprung mass and a second member coupled to the unsprung mass, the second member configured for reciprocating translational movement with respect to the first member through a first end thereof, the apparatus comprising:
a resilient bumper mounted within the first member at a second end thereof, the resilient bumper configured for compression by the second member;
a piezoelectric device coupled to the resilient bumper for generating electrical energy when strained by the second member.

12. An apparatus according to claim 11 wherein the piezoelectric device is a flexible piezoelectric fiber material.

13. An apparatus according to claim 12 wherein the piezoelectric device is a flexible disk.

14. An apparatus according to claim 13 wherein the flexible disk is imbedded within the resilient bumper.

15. An apparatus according to claim 13 wherein the flexible disk is mounted on a surface of the resilient bumper.

16. An apparatus according to claim 13 further comprising a rectifier coupled to the flexible disk.

17. An apparatus according to claim 16 wherein the rectifier is mounted on the shock absorber.

18. An energy harvesting apparatus, for use on a vehicle having a spring mass and an unsprung mass, the apparatus comprising:
a shock absorber, comprising:
a dust tube coupled to the sprung mass;
a damper tube mounted for telescopic movement within the dust tube and mounted to the unsprung mass; and
a jounce bumper mounted within the dust tube and configured for impact by the damper tube; and
a piezoelectric device coupled to the jounce bumper for generating electrical energy when strained due to impact by the damper tube.

19. An apparatus according to claim 18 wherein the piezoelectric device is a flexible disk mounted on a surface of the jounce bumper.

20. An apparatus according to claim 18 wherein the piezoelectric device is a flexible disk imbedded in the jounce bumper.

* * * * *